(12) United States Patent
Wilcynski et al.

(10) Patent No.: US 11,572,177 B2
(45) Date of Patent: Feb. 7, 2023

(54) SEAT CABLE ADJUSTMENT SYSTEM AND METHOD

(71) Applicant: THE BOEING COMPANY, Chicago, IL (US)

(72) Inventors: Paul W. Wilcynski, Seattle, WA (US); Martin C. Adams, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 987 days.

(21) Appl. No.: 16/365,777

(22) Filed: Mar. 27, 2019

(65) Prior Publication Data

US 2020/0307802 A1    Oct. 1, 2020

(51) Int. Cl.
*B64D 11/06* (2006.01)
*B65H 75/48* (2006.01)

(52) U.S. Cl.
CPC ....... *B64D 11/0624* (2014.12); *B65H 75/486* (2013.01)

(58) Field of Classification Search
CPC ........................ B64D 11/0624; B64D 11/0648
See application file for complete search history.

(56) References Cited

U.S. PATENT DOCUMENTS

| | | | |
|---|---|---|---|
| 6,267,430 B1 * | 7/2001 | Cresseaux ............ | B60N 2/0224 296/65.01 |
| 7,713,009 B2 | 5/2010 | Hudson | |
| 7,785,053 B2 | 8/2010 | Hudson | |
| 8,128,326 B2 | 3/2012 | Hudson | |
| 8,920,085 B2 | 12/2014 | Hudson et al. | |
| 9,567,086 B2 | 2/2017 | Siegmeth | |
| 2003/0042360 A1 * | 3/2003 | Lambiaso ............ | B60N 2/0224 244/118.5 |
| 2014/0138116 A1 * | 5/2014 | Burke ................ | B64D 11/0624 174/69 |
| 2017/0225789 A1 * | 8/2017 | Silva ....................... | B60L 50/10 |

FOREIGN PATENT DOCUMENTS

| WO | WO-2005079310 A2 * | 9/2005 | .......... B60N 2/4693 |
|---|---|---|---|
| WO | WO-2005094290 A2 * | 10/2005 | ............. B64D 11/06 |

OTHER PUBLICATIONS

U.S. Appl. No. 16/365,788, filed Mar. 27, 2019.
U.S. Appl. No. 16/529,921, filed Aug. 2, 2019.
U.S. Appl. No. 16/529,935, filed Aug. 2, 2019.

(Continued)

*Primary Examiner* — Timothy J Brindley
(74) *Attorney, Agent, or Firm* — The Small Patent Law Group LLC; Joseph M. Butscher (57) ABSTRACT

A seat assembly within an internal cabin of a vehicle includes an electrical interface housing that contains a first portion of a cable that is configured to provide one or both of electrical power or electrical signals to one or more electrical components. A cable reel rotatably coupled to a body of the electrical interface housing. The cable reel is configured to rotate about an axis. The first portion of the cable includes an adjustable coil that is coiled around the cable reel. The cable reel is rotatable in a first direction to deploy the first portion of the cable outwardly from the electrical interface housing and a second direction to retract the first portion of the cable inwardly into the electrical interface housing.

21 Claims, 7 Drawing Sheets

(56) References Cited

OTHER PUBLICATIONS

U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.

* cited by examiner

SEAT CABLE ADJUSTMENT SYSTEM AND METHOD

FIELD OF EMBODIMENTS OF THE DISCLOSURE

Embodiments of the present disclosure generally relate to seat cable adjustment systems and methods, and more particularly, to seat cable adjustment systems and methods that allow for efficient adjustment of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

Between flights of an aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section.

In order to change the pitch between rows of seats, the seats of at least one of the rows are completely removed and lifted from seat tracks. The seats are then moved to a new position, where they are secured to the seat tracks. Aircraft mechanics typically use tools to remove the seats from the seat tracks, reposition and align the seats in relation to the new positions, and securely lock the seats in the new positions. Moreover, any electrical connections within the seats are typically disconnected before the seats are moved, and then reconnected at the new positions.

As can be appreciated, the process of removing the seats from the seat tracks, disconnecting electrical couplings, moving the seats to new positions, reconnecting electrical couplings, and securing the seats at the new positions is time and labor intensive. If there is a relatively short time until a subsequent flight, there may not be sufficient time to adjust the seats to new positions.

SUMMARY OF THE DISCLOSURE

A need exists for an efficient system and method for moving seats within an internal cabin of an aircraft. Further, a need exists for a system and method that allow for quick and efficient adjustment of seats, including electrical components, within an internal cabin.

With those needs in mind, certain embodiments of the present disclosure provide a seat assembly within an internal cabin of a vehicle. The seat assembly includes an electrical interface housing that contains a first portion of a cable that is configured to provide one or both of electrical power or electrical signals to one or more electrical components. A cable reel is rotatably coupled to a body of the electrical interface housing. The cable reel is configured to rotate about an axis. The first portion of the cable includes an adjustable coil that is coiled around the cable reel. The cable reel is rotatable in a first direction to deploy the first portion of the cable outwardly from the electrical interface housing and a second direction to retract the first portion of the cable inwardly into the electrical interface housing.

In at least one embodiment, the portion of the cable further includes fixed portions that are securely fixed within the electrical interface housing. The cable includes a cable extension that connects to a second portion of the cable within another electrical interface housing of another seat assembly. In at least one embodiment, the cable extension is configured to be manipulated to selectively deploy and retract the first portion of the cable in relation to the electrical interface housing.

The seat assembly may include a spring operatively coupled to the cable reel. The spring exerts a resistive force into the cable reel that urges the cable reel towards a cable retracting position.

The seat assembly may include a clutch operatively coupled to the cable reel, and a ratchet operatively coupled to the cable reel. The cable reel may be spring-biased.

The seat assembly may include a motor operatively coupled to the cable reel. A control may be operatively coupled to the motor.

The seat assembly may include a control knob coupled to the cable reel.

Certain embodiments of the present disclosure provide a vehicle including an internal cabin, and a first seat assembly within the internal cabin. The first seat assembly includes a first electrical interface housing that contains a first portion of a cable that is configured to provide one or both of electrical power or electrical signals to one or more first electrical components, and a first cable reel rotatably coupled to a first body of the first electrical interface housing. The first cable reel is configured to rotate about a first axis. The first portion of the cable includes a first adjustable coil that is coiled around the first cable reel. The first cable reel is rotatable in a first direction to deploy the first portion of the cable outwardly from the first electrical interface housing and a second direction to retract the first portion of the cable inwardly into the first electrical interface housing. A second seat assembly is with the internal cabin. The second seat assembly includes a second electrical interface housing that contains a second portion of the cable that is configured to provide one or both of electrical power or electrical signals to one or more second electrical components. A second cable reel is rotatably coupled to a second body of the second electrical interface housing. The second cable reel is configured to rotate about a second axis. The second portion of the cable includes a second adjustable coil that is coiled around the second cable reel. The second cable reel is rotatable in a third direction to deploy the second portion of the cable outwardly from the second electrical interface housing and a fourth direction to retract the second portion of the cable inwardly into the second electrical interface housing.

Certain embodiments of the present disclosure provide a seat cable adjustment method for an internal cabin of a vehicle. The seat cable adjustment method includes containing a first portion of a cable within an electrical interface housing, providing one or both of electrical power or electrical signals to one or more electrical components by the first portion of the cable, rotatably coupling a cable reel to a body of the electrical interface housing (wherein the cable reel is configured to rotate about an axis), coiling an adjustable coil of the first portion of the cable around the cable reel, and selectively rotating the cable reel in a first direction to deploy the first portion of the cable outwardly from the electrical interface housing and a second direction to retract the first portion of the cable inwardly into the electrical interface housing.

The seat cable adjustment method may also include securely fixing fixed portions of the first portion of the cable within the electrical interface housing. In at least one embodiment, the seat cable adjustment method also includes connecting the first portion of the cable to a second portion of the cable within an electrical interface housing of another seat assembly by a cable extension.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat cable adjustment systems and methods that include retractable seat cable reels that allow electrical components of seat assemblies to remain connected as the seat assemblies are adjusted to different pitches. In at least one embodiment, a device for selectively deploying (for example, lengthening) and retracting (for example, shortening) electrical cable between rows of vehicle seating includes an adjustment portion that is configured to allow for extension and retraction of a length of cable (such as wiring, electrical conduits, and/or the like) corresponding to a change in seat pitch of a flexible seating zone. In at least one embodiment, a method of reconfiguring cable of seat assemblies within an internal cabin of a vehicle includes moving adjacent rows of seats forward and aft relative to each other, and automatically adjusting (for example, extending or retracting) at least one cable to compensate for the relative movement between the seat assemblies.

Figure 1:
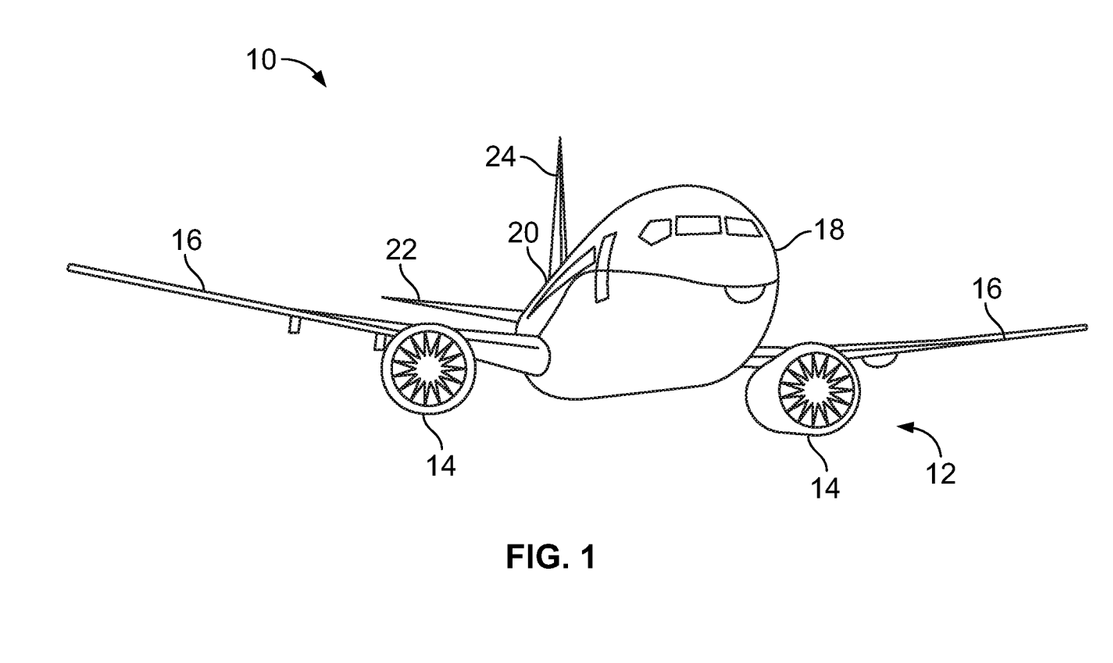
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
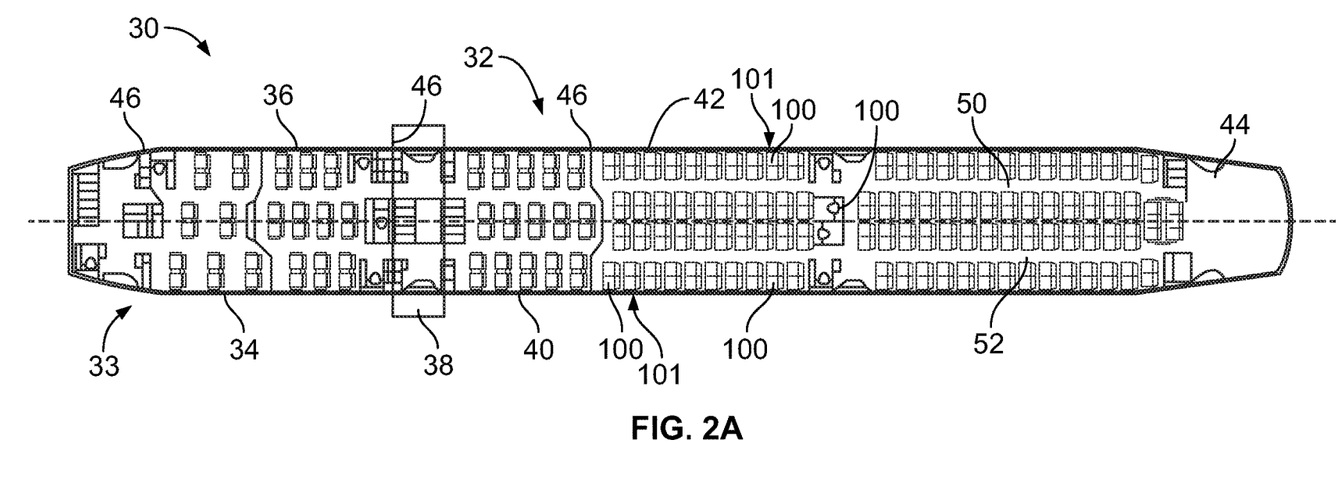
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. The seat assemblies 100 include cable adjustment systems, as described herein, that allow spacing or pitch between rows 101 of adjacent seat assemblies 100 to be quickly and efficiently adjusted without cables (such as electrical wiring, conduits, and the like) being disconnected.

Figure 2B:
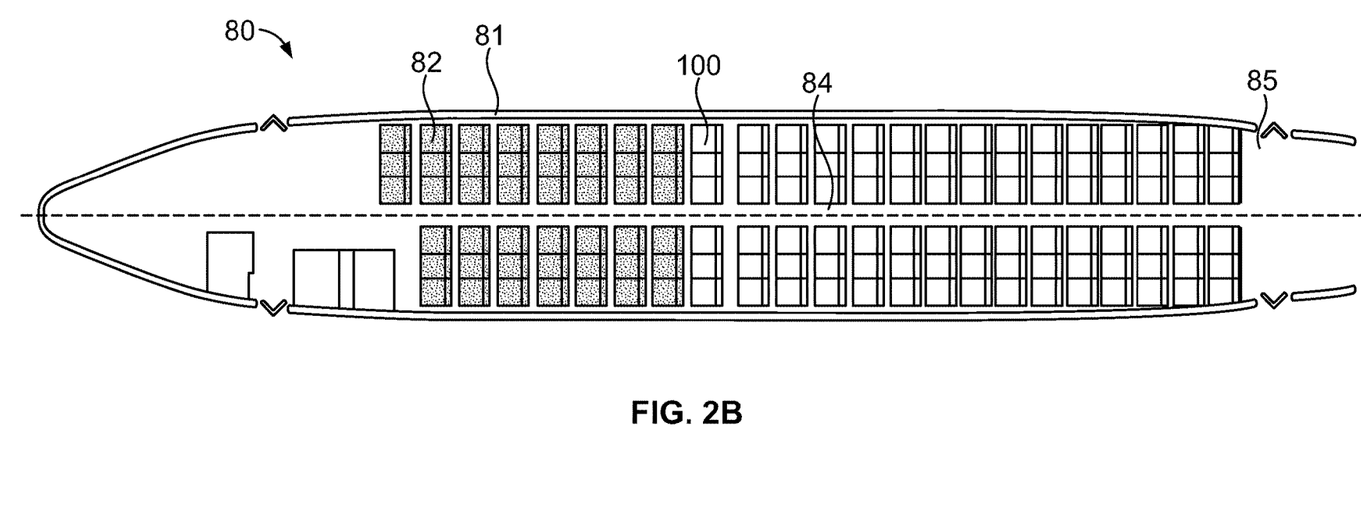
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
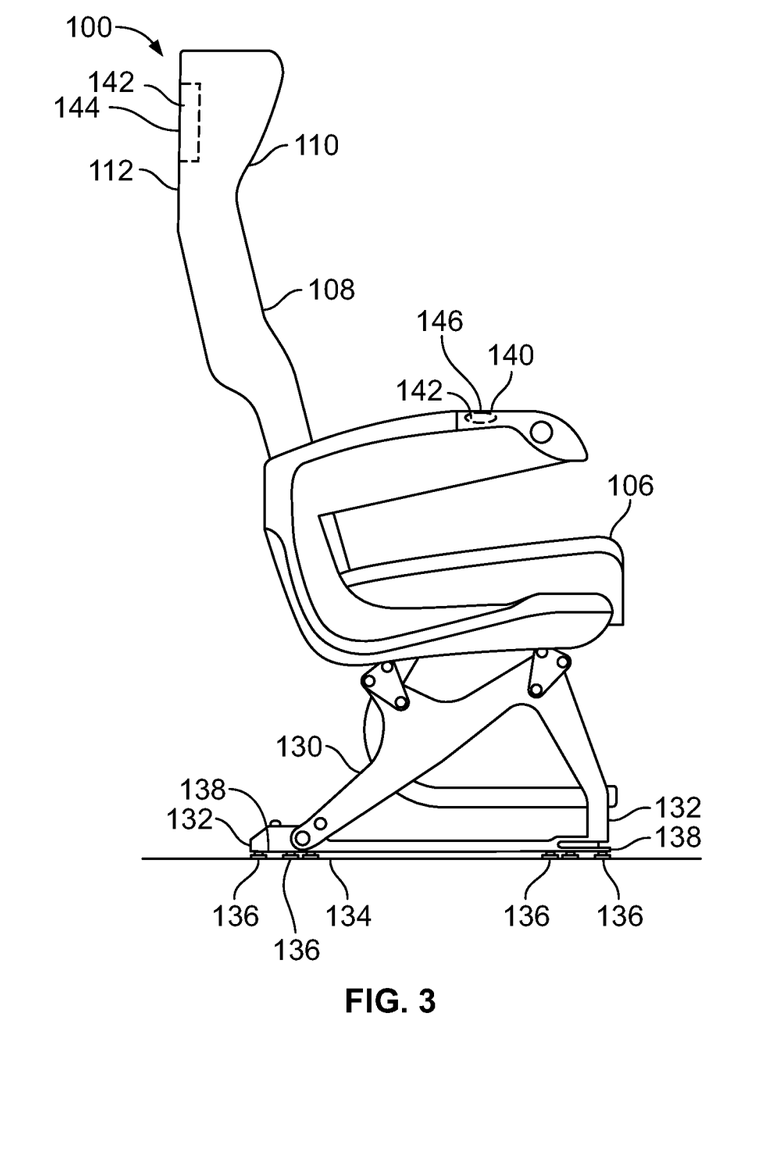
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 also includes one or more electrical components 142, such as an entertainment system including a monitor 144 in a back 112 of the headrest 110, a user interface 146 (including one or more controls), which may be located in an arm rest 140, and/or the like. An electrical cable (not shown in FIG. 3) extends through portions of the seat assembly 100 to provide electrical power and signals to the electrical components 142.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

Figure 4:
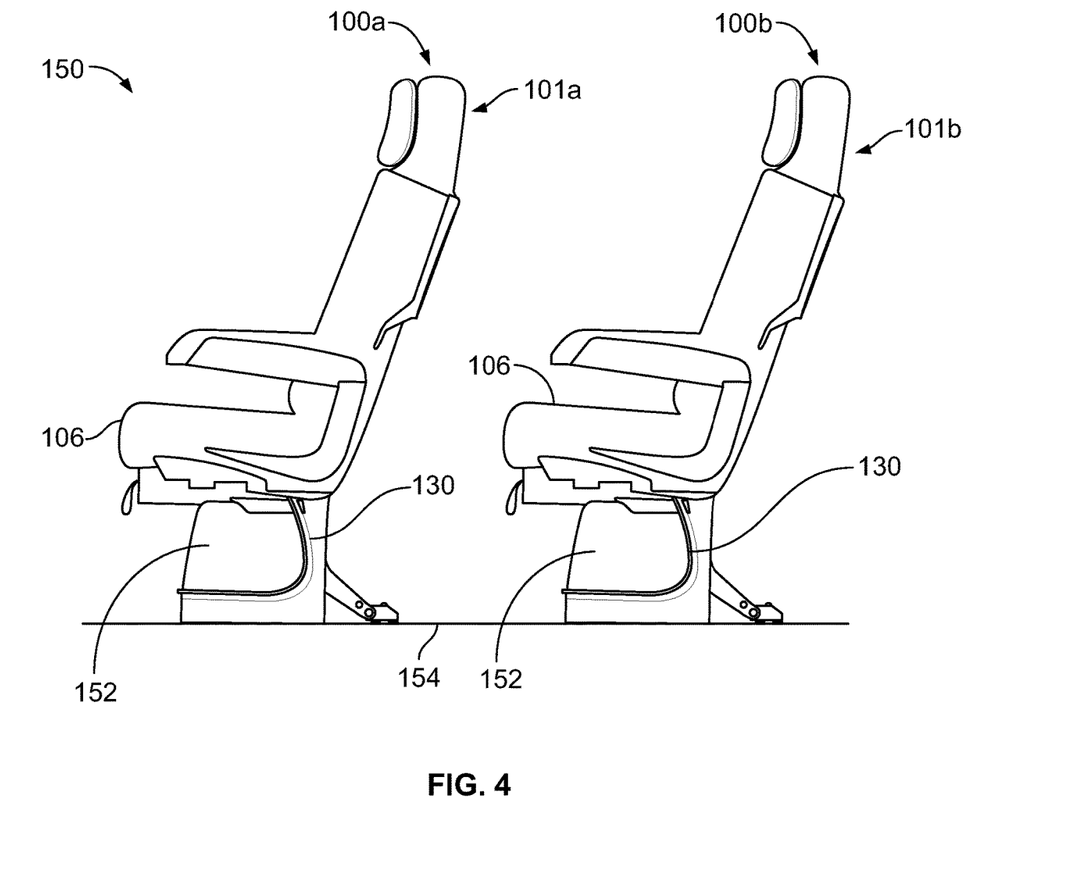
FIG. 4 illustrates a lateral view of a first seat assembly of a first row and a second seat assembly of a second row within an internal cabin, according to an embodiment of the present disclosure.

FIG. 4 illustrates a lateral view of a first seat assembly 100a of a first row 101a and a second seat assembly 100b of a second row 101b within an internal cabin 150 (such as the internal cabins 30 and 80 of FIGS. 2A and 2B, respectively), according to an embodiment of the present disclosure. The seat assemblies 100a and 100b are examples of the seat assembly 100 shown and described with respect to FIG. 3.

An electrical interface housing 152 is disposed underneath the seat cushions 106 of the seat assemblies 100a and 100b, such as within or proximate to the bases 130. For example, the electrical interface housing 152 may be a seat inflight entertainment (IFE) interface. The electrical interface housing 152 contains cable segments (such as electrical wiring) that provide electrical power and signals to the electrical components 142 (shown in FIG. 3) of the seat assemblies 100a and 100b. The cable segments of the seat assemblies 100a and 100b are connected together through a cable extension 154 that runs parallel to the seat tracks 134 (shown in FIG. 3). The cable extension 154 may be retained within a cable track formed in floor panels, or positioned over the floor panels and covered by a covering sleeve, for example.

In at least one embodiment, the cable segments within the electrical interface housings 152 and the cable extension 154 are part of a single, unitary electrical cable. In at least one other embodiment, portions of the cable segments and/or the cable extension 154 may be separate pieces that are connected together through plug and receptacle interfaces.

Embodiments of the present disclosure provide seat cable adjustment systems and methods that allow for quick and efficient adjustment of cable between the seat assemblies 100a and 100b. FIG. 4 shows two rows 101a and 101b of seat assemblies 100a and 100b. The seat cable adjustment systems and methods may be used between additional seat assemblies of additional rows. For example, an electrical cable may extend between three or more rows of seat assemblies, and embodiments of the present disclosure allow for quick and easy adjustment of the cable as a pitch between at least two of the rows is adjusted.

Figure 5:
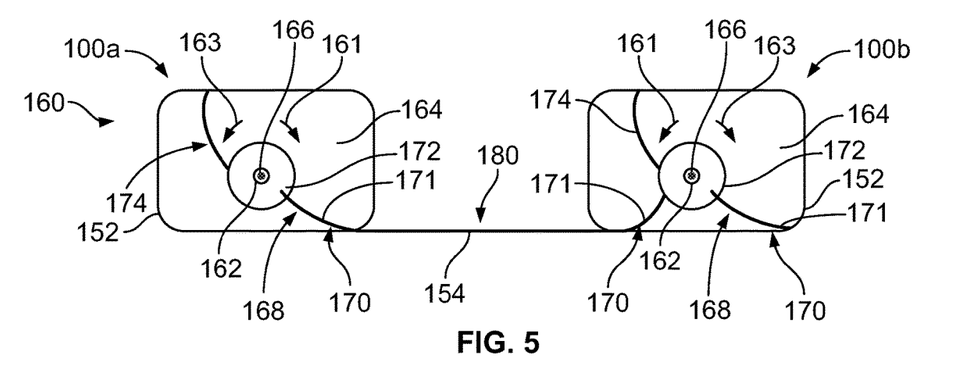
FIG. 5 illustrates a lateral view of a seat cable adjustment system between the first seat assembly and the second seat assembly, according to an embodiment of the present disclosure.

FIG. 5 illustrates a lateral view of a seat cable adjustment system 160 between the first seat assembly 100a and the second seat assembly 100b, according to an embodiment of the present disclosure. For the sake of clarity, not all of the portions of the seat assemblies 100a and 100b are shown in FIG. 5. Instead, FIG. 5 illustrates lateral internal views of the electrical interface housings 152 of the first seat assembly 100a and the second seat assembly 100b.

The seat cable adjustment system 160 includes a cable reel 162 within each electrical interface housing 152. The cable reel 162 is rotatably coupled to a body 164 of the electrical interface housing 152. The cable reel 162 is configured to rotate about an axis 166.

The cable segments 168 are contained within the electrical interface housings 152. Each cable segment 168 includes an adjustable portion 170 including an extension tail 171 that connects to an adjustable coil 172 that is coiled around the cable reel 162. The extension tail 171 of the first seat assembly 100a integrally connects to the cable extension 154, which, in turn connects to a leading extension tail 171 of the second seat assembly 100b. The second seat assembly 100b may also include a trailing extension tail 171 that connects to another cable extension (not shown in FIG. 5) that connects to an electrical interface housing of another seat assembly of another row. Similarly, the first seat assembly 100a may also include a leading extension tail that connects to yet another cable extension of yet another electrical interface housing of yet another seat assembly of yet another row.

The adjustable portions 170, including the extension tails 171 and the adjustable coils 172, are moveable and adjustable. The adjustable coils 172 also connect to fixed portions 174 that extend upwardly into the electrical interface housings 152 and route upwardly to electrical components of the seat assemblies 100a and 100b. The fixed portions 174 are securely fixed within the electrical interface housings 152 and/or other portions of the seat assemblies 100a and 100b, such as through fasteners, clamps, ties, and/or the like.

Referring to FIG. 3-5, each seat assembly 100a and 100b within the internal cabin 150 includes an electrical interface housing 152 that contains a portion of the cable 180 extending between the seat assemblies 100a and 100b. The cable 180 is configured to provide one or both of electrical power or electrical signals to the electrical components 142. A cable reel 162 is rotatably coupled to a body 164 of the electrical interface housing 152. The cable reel 162 is configured to rotate about an axis 166. The portion of the cable 180 includes an adjustable coil 172 that is coiled around the cable reel 162. The cable reel 162 is configured to rotate in a first rotational direction 161 to deploy the portion of the cable 180 outwardly from the electrical interface housing 152 and a second rotational direction 163 to retract the portion of the cable 180 inwardly into the electrical interface housing 152. In at least one embodiment, the first rotational direction 161 of the cable reel 162 of the seat assembly 100a is opposite from the first rotational direction of the cable reel 162 of the seat assembly 100b. Similarly, the second rotational direction 163 of the of the cable reel 162 of the seat assembly 100a is opposite from the second rotational direction of the cable reel 162 of the seat assembly 100b.

Figure 6:
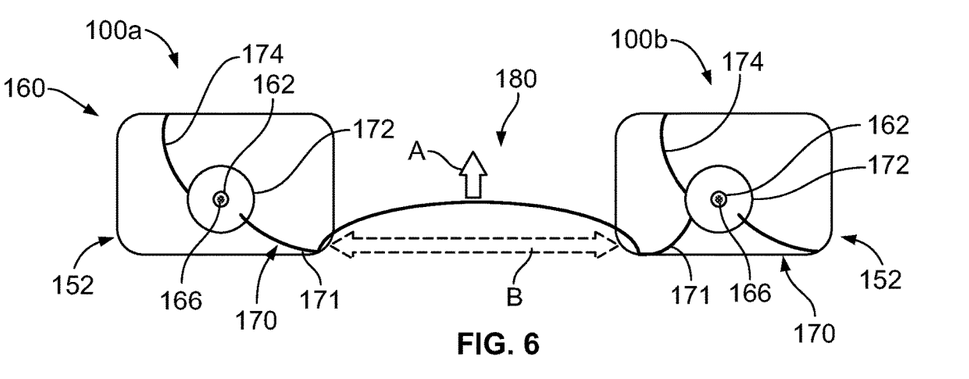
FIG. 6 illustrates a lateral view of the seat cable adjustment system with cable being adjusted between the first seat assembly and the second seat assembly, according to an embodiment of the present disclosure.

FIG. 6 illustrates a lateral view of the seat cable adjustment system 160 with cable 180 being adjusted between the first seat assembly 100a and the second seat assembly 100b, according to an embodiment of the present disclosure. The cable 180 includes the adjustable portions 170, the fixed portions 174, and the cable extension 154. When a pitch is adjusted between the seat assemblies 100a and 100b, the cable extension 154 may be upwardly pulled in the direction of arrow A. As the cable extension 154 is upwardly pulled in the direction of arrow A, the cable reels 162 rotate about their axes 166, thereby allowing the adjustable coils 172 of the cable 180 to outwardly extend off the cable reels 162, thereby deploying (for example, lengthening) the extension tails 171 and the cable extension 154. In this manner, additional coiled cable is fed off the cable reels 162 to provide slack and additional length to the cable 180 so that the seat assemblies 100a and 100b may be spread apart in the direction of arrow B to an increased pitch therebetween.

Figure 7:
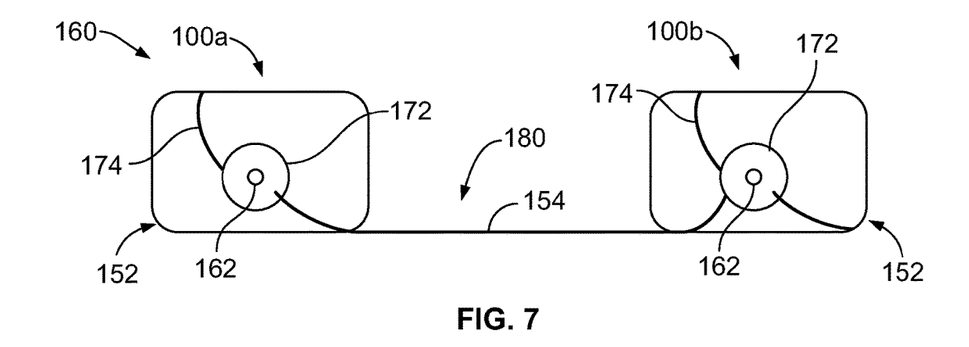
FIG. 7 illustrates a lateral view of the seat cable adjustment system in which the first seat assembly and the second seat assembly are positioned at an increased pitch, according to an embodiment of the present disclosure.

FIG. 7 illustrates a lateral view of the seat cable adjustment system 160 in which the first seat assembly 100a and the second seat assembly 100b are positioned at an increased pitch, according to an embodiment of the present disclosure. Referring to FIGS. 6 and 7, after the cable 180 has been upwardly pulled to provide slack in the cable 180, the seat assemblies 100a and 100b are moved to a desired pitch. The slack in the cable 180 is taken in, such as by moving the seat assemblies 100a and 100b apart.

If the seat assemblies 100a and 100b are to be positioned at a closer pitch, such as shown in FIG. 5, the seat assemblies 100a and 100b may be moved closer together, and the slack in the cable 180 may be decreased by the cable reels 162 rotating in a reverse direction to wind slack of the cable adjustable coils 172 around the cable reels 162.

Figure 8:
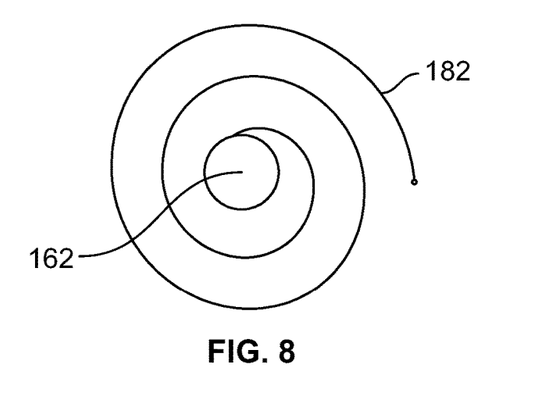
FIG. 8 illustrates a lateral view of a cable reel, according to an embodiment of the present disclosure.

FIG. 8 illustrates a lateral view of the cable reel 162, according to an embodiment of the present disclosure. In this embodiment, the cable reel 162 may be operatively coupled to a spring 182, such as a metal spring coil The spring 182 exerts a resistive force into the cable reel 162 that urges the cable reel 162 into a retracting position. That is, the cable reel 162 may be spring-biased towards a cable retracting position. Referring to FIGS. 5-8, as the cable 180 is pulled to increase slack, the force of an individual pulling on the cable 180 overcomes the resistive force of the spring 182, thereby allowing the cable 180 to outwardly unwind of the cable reel 162. As the pulling force in the cable 180 disengages, the resistive force of the spring 182 causes the cable reel 162 to reverse rotation, thereby pulling additional slack of the cable 180 back around the cable reel 162. In this manner, the spring 182 retracts portions of the cable 180 back into the electrical interface housing 152 and around the cable reel 162.

Figure 9:
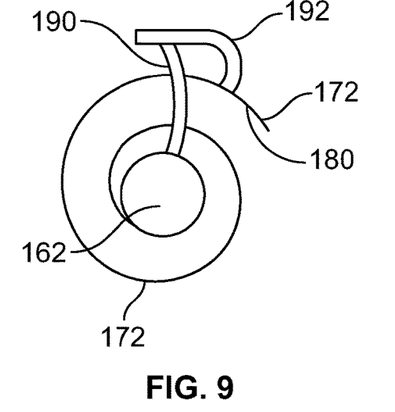
FIG. 9 illustrates a lateral view of a cable reel, according to an embodiment of the present disclosure.

FIG. 9 illustrates a lateral view of the cable reel 162, according to an embodiment of the present disclosure. In this embodiment, the cable reel 162 may be operatively coupled to a clutch 190 and a ratchet 192. The ratchet 192 may couple to the adjustable coil 172 of the cable 180 to prevent the adjustable coil 172 from being deployed (for example, extended) or retracted (for example, shortened) in relation to the cable reel 162. Referring to FIGS. 5-7 and 9, as the cable 180 is upwardly pulled in the direction of arrow A, the clutch 190 is actuated to release the ratchet 192 from the adjustable coil 172, thereby allowing the adjustable coil 172 to outwardly extend off the cable reel 162. The cable reel 162 may be spring-biased, as described with respect to FIG. 8. As the cable 180 is upwardly pulled in the direction of arrow A again, the clutch 190 may be actuated again, so that the ratchet 192 reengages the adjustable coil 172 to maintain the cable 180 at a desired length.

Figure 10:
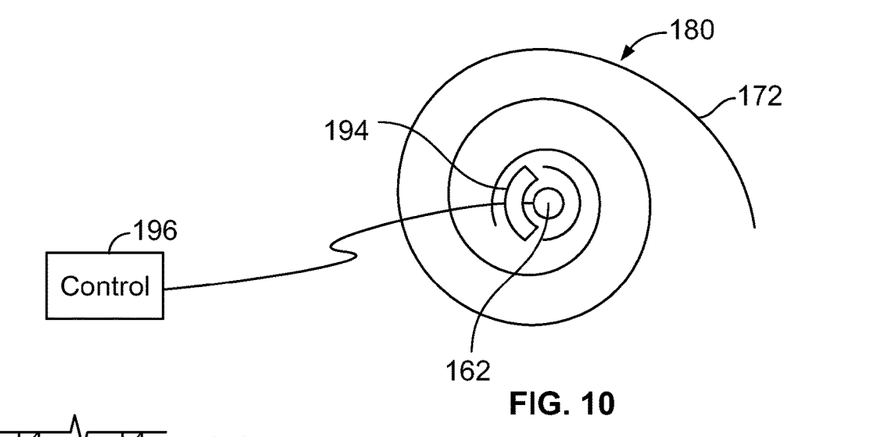
FIG. 10 illustrates a lateral view of a cable reel, according to an embodiment of the present disclosure.

FIG. 10 illustrates a lateral view of the cable reel 162, according to an embodiment of the present disclosure. In this embodiment, the cable reel 162 is operatively coupled to a motor 194, such as an electric motor, that is operatively coupled to a control 196, such as one or more buttons, switches, or the like, through one or more electrical connections. Referring to FIGS. 5-7 and 10, the control 196 may be secured to a portion of the seat assembly 100a, 100b or the electrical interface housing 152. The control 196 is operated to control rotation of the cable reel 162, via the motor 194, to selectively extend and retract the cable 180 in relation to the cable reel 162.

Figure 11:
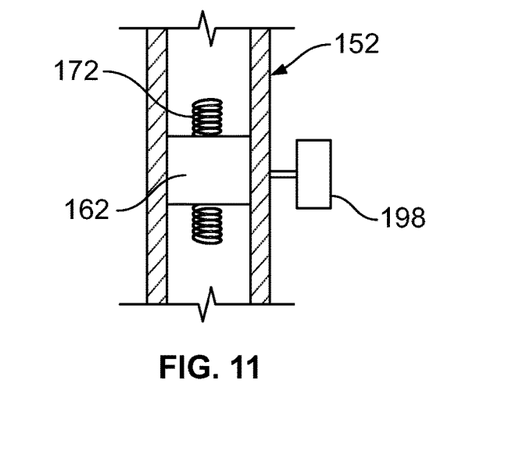
FIG. 11 illustrates an internal view of an electrical interface housing, according to an embodiment of the present disclosure.

FIG. 11 illustrates an internal view of the electrical interface housing 152, according to an embodiment of the present disclosure. In this embodiment, a control knob 198 is coupled to the cable reel 162. The control knob 198 may extend outside of the electrical interface housing 152. The control knob 198 may be manipulated by an individual to rotate the cable reel 162 to selectively lengthen and retract the cable 180.

Figure 12:
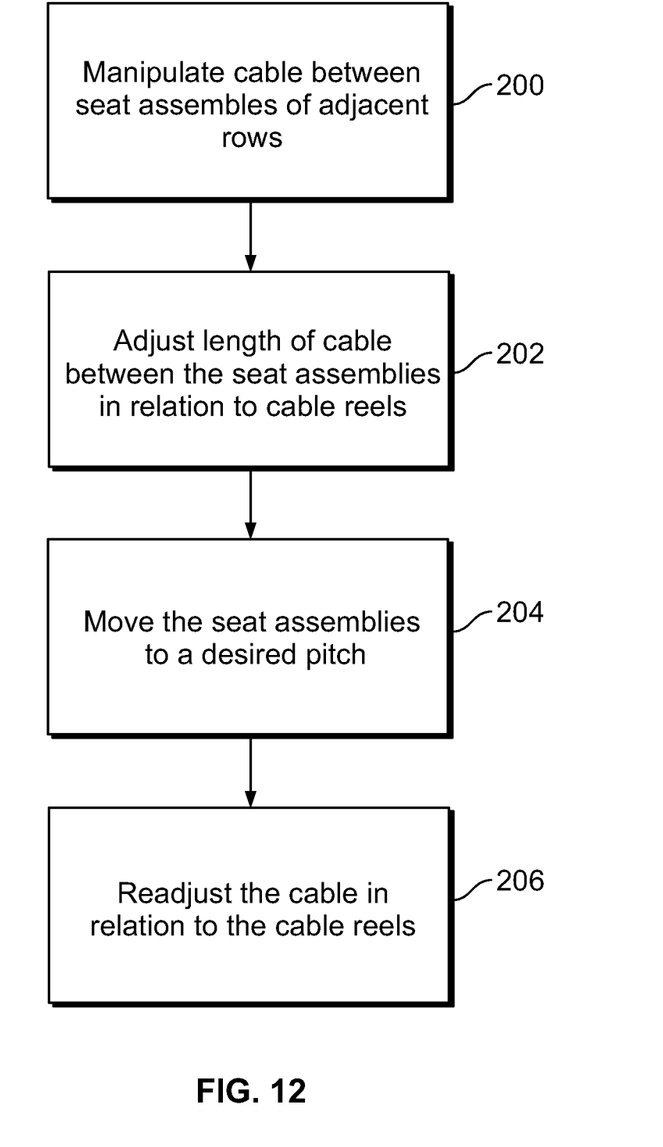
FIG. 12 illustrates a flow chart of a seat adjustment method, according to an embodiment of the present disclosure.

FIG. 12 illustrates a flow chart of a seat adjustment method, according to an embodiment of the present disclosure. At 200, the cable 180 between the seat assemblies 100a and 100b is manipulated, such as by pulling the cable 180 in the direction of arrow A in FIG. 6. At 202, due to the manipulation, the length of the cable 180 is adjusted in relation to the cable reels 162 of the electrical interface housings 152 of the seat assemblies 100a and/or 100b. At 204, the seat assemblies 100a and 100b are moved to a desired pitch. At 206, the cable 180 is readjusted in relation to the cable reels 162, such as to retract the cable 180 to take up any slack.

As explained herein, embodiments of the present disclosure provide efficient systems and methods for moving seats within an internal cabin of an aircraft. Further, embodiments of the present disclosure provide systems and methods that allow for quick and efficient adjustment of seats within an internal cabin. Embodiments of the present disclosure allow for adjusting a pitch between seat assemblies without disconnecting electrical components of the seat assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly within an internal cabin of a vehicle, the seat assembly comprising:
   an electrical interface housing that contains a first portion of a cable that is configured to provide one or both of electrical power or electrical signals to one or more electrical components;
   a cable reel rotatably coupled to a body of the electrical interface housing, wherein the cable reel is one or both of on or within the seat assembly;
   a clutch operatively coupled to the cable reel; and
   a ratchet operatively coupled to the cable reel,
   wherein the first portion of the cable comprises an adjustable coil that is coiled around the cable reel, and wherein the cable reel is rotatable in a first direction to deploy the first portion of the cable outwardly from the electrical interface housing and a second direction to retract the first portion of the cable inwardly into the electrical interface housing.

2. The seat assembly of claim 1, wherein the portion of the cable further comprises fixed portions that are securely fixed within the electrical interface housing.

3. The seat assembly of claim 1, wherein the cable further comprises a cable extension that connects to a second portion of the cable within another electrical interface housing of another seat assembly.

4. The seat assembly of claim 3, wherein the cable extension is configured to be manipulated to selectively deploy and retract the first portion of the cable in relation to the electrical interface housing.

5. The seat assembly of claim 1, further comprising a spring operatively coupled to the cable reel, wherein the spring exerts a resistive force into the cable reel that urges the cable reel towards a cable retracting position.

6. The seat assembly of claim 1, wherein the cable reel is spring-biased.

7. The seat assembly of claim 1, further comprising a motor operatively coupled to the cable reel.

8. The seat assembly of claim 7, further comprising a control operatively coupled to the motor.

9. The seat assembly of claim 1, further comprising a control knob coupled to the cable reel.

10. A vehicle comprising:
    an internal cabin;
    a first seat assembly within the internal cabin, wherein the first seat assembly comprises:
       a first electrical interface housing that contains a first portion of a cable that is configured to provide one or both of electrical power or electrical signals to one or more first electrical components; and
       a first cable reel rotatably coupled to a first body of the first electrical interface housing, wherein the first cable reel is configured to rotate about a first axis,
       wherein the first portion of the cable comprises a first adjustable coil that is coiled around the first cable reel, and wherein the first cable reel is rotatable in a first direction to deploy the first portion of the cable outwardly from the first electrical interface housing and a second direction to retract the first portion of the cable inwardly into the first electrical interface housing; and
    a second seat assembly with the internal cabin, wherein the second seat assembly comprises:
       a second electrical interface housing that contains a second portion of the cable that is configured to provide one or both of electrical power or electrical signals to one or more second electrical components; and
       a second cable reel rotatably coupled to a second body of the second electrical interface housing, wherein the second cable reel is configured to rotate about a second axis,
       wherein the second portion of the cable comprises a second adjustable coil that is coiled around the second cable reel, and wherein the second cable reel is rotatable in a third direction to deploy the second portion of the cable outwardly from the second electrical interface housing and a fourth direction to retract the second portion of the cable inwardly into the second electrical interface housing, wherein the first seat assembly or the second seat assembly further comprises:
- a clutch operatively coupled to the first cable reel or the second cable reel; and
- a ratchet operatively coupled to the first cable reel or the second cable reel.

11. The seat assembly of claim 1, wherein the electrical interface housing is one or both of on or within the seat assembly, and wherein the cable reel is one or both of on or within the seat assembly.

12. The vehicle of claim 10, wherein the first portion of the cable further comprises first fixed portions that are securely fixed within the first electrical interface housing, and wherein the second portion of the cable further comprises second fixed portions that are securely fixed within the second electrical interface housing.

13. The vehicle of claim 10, wherein the cable further comprises a cable extension that connects the first portion to the second portion.

14. The vehicle of claim 10, wherein the first seat assembly or the second seat assembly further comprises a spring operatively coupled to the first cable reel or the second cable, wherein the spring exerts a resistive force into the first cable reel or the second cable reel that urges the first cable reel or the second cable reel towards a cable retracting position.

15. The vehicle of claim 10, wherein the first seat assembly or the second seat assembly further comprises a motor operatively coupled to the first cable reel or the second cable reel.

16. The vehicle of claim 10, wherein the first seat assembly or the second seat assembly further comprises a control knob coupled to the first cable reel or the second cable reel.

17. The vehicle of claim 10, wherein the first electrical interface housing is one or both of on or within the first seat assembly, wherein the first cable reel is one or both of on or within the first seat assembly, wherein the second electrical interface housing is one or both of on or within the second seat assembly, and wherein the second cable reel is one or both of on or within the second seat assembly.

18. A seat cable adjustment method for an internal cabin of a vehicle, the seat cable adjustment method comprising:
- containing a first portion of a cable within an electrical interface housing;
- providing one or both of electrical power or electrical signals to one or more electrical components by the first portion of the cable;
- rotatably coupling a cable reel to a body of the electrical interface housing, wherein the cable reel is configured to rotate about an axis;
- coiling an adjustable coil of the first portion of the cable around the cable reel;
- operatively coupling a clutch and a ratchet to the cable reel; and
- selectively rotating the cable reel in a first direction to deploy the first portion of the cable outwardly from the electrical interface housing and a second direction to retract the first portion of the cable inwardly into the electrical interface housing.

19. The seat cable adjustment method of claim 18, further comprising securely fixing fixed portions of the first portion of the cable within the electrical interface housing.

20. The seat cable adjustment method of claim 18, further comprising connecting the first portion of the cable to a second portion of the cable within an electrical interface housing of another seat assembly by a cable extension.

21. The seat cable adjustment method of claim 18, wherein the electrical interface housing is one or both of on or within a seat assembly, and wherein the cable reel is one or both of on or within the seat assembly.

* * * * *